United States Patent
Malavia et al.

(10) Patent No.: US 12,518,572 B2
(45) Date of Patent: Jan. 6, 2026

(54) SYSTEMS AND METHODS FOR CRITICAL DATA SAVE IN ELECTRONIC CONTROL MODULES

(71) Applicant: Cummins Inc., Columbus, IN (US)

(72) Inventors: Vratika Malavia, Pune (IN); Amar Deshmukh, Pune (IN); Abhik Giri, Baharagora (IN)

(73) Assignee: Cummins Inc., Columbus, IN (US)

( * ) Notice: Subject to any disclaimer, the term of this patent is extended or adjusted under 35 U.S.C. 154(b) by 193 days.

(21) Appl. No.: 18/022,930

(22) PCT Filed: Jul. 7, 2021

(86) PCT No.: PCT/US2021/040663
§ 371 (c)(1),
(2) Date: Feb. 23, 2023

(87) PCT Pub. No.: WO2022/046293
PCT Pub. Date: Mar. 3, 2022

(65) Prior Publication Data
US 2024/0013589 A1 Jan. 11, 2024

(30) Foreign Application Priority Data
Aug. 24, 2020 (IN) .............. 202041036295

(51) Int. Cl.
*G07C 5/02* (2006.01)
*B60R 16/033* (2006.01)
*G05B 15/02* (2006.01)

(52) U.S. Cl.
CPC .............. *G07C 5/02* (2013.01); *G05B 15/02* (2013.01); *B60R 16/033* (2013.01)

(58) Field of Classification Search
CPC .......... G07C 5/02; G05B 15/02; B60R 16/033
See application file for complete search history.

(56) References Cited

U.S. PATENT DOCUMENTS

| 5,673,668 A | 10/1997 | Pallett et al. |
| 5,999,876 A | 12/1999 | Irons et al. |

(Continued)

FOREIGN PATENT DOCUMENTS

| CN | 1906394 A | 1/2007 |
| CN | 104828072 A | 8/2015 |

(Continued)

OTHER PUBLICATIONS

English Machine Translation of CN-107797946-B (Year: 2021).*
(Continued)

*Primary Examiner* — Andrew J Cromer
(74) *Attorney, Agent, or Firm* — Foley & Lardner LLP (57) ABSTRACT

A controller for a vehicle includes at least one processor and at least one memory storing instructions that, when executed by the processor, cause the controller to perform various operations. The operations include determining that a power loss to the controller has occurred. In response to the determination that the power loss has occurred, the operations are structured to determine whether a key switch associated with an engine of the vehicle is on; and, when the key switch is on, save operating data to a ferroelectric random access memory (TRAM) coupled to the controller.

18 Claims, 4 Drawing Sheets

(56) References Cited

U.S. PATENT DOCUMENTS

| | | | |
|---|---|---|---|
| 6,347,267 B1 | 2/2002 | Murakami | |
| 6,999,869 B1 | 2/2006 | Gitlin et al. | |
| 8,448,023 B2 | 5/2013 | James et al. | |
| 9,753,828 B1 | 9/2017 | Crow et al. | |
| 10,401,937 B2 | 9/2019 | Darin et al. | |
| 2002/0008488 A1 | 1/2002 | Pearson et al. | |
| 2003/0218925 A1 | 11/2003 | Torjussen et al. | |
| 2004/0041403 A1 | 3/2004 | Fattic | |
| 2007/0283110 A1 | 12/2007 | Arai et al. | |
| 2009/0021344 A1* | 1/2009 | Proefke | B60R 25/045 340/5.2 |
| 2015/0029808 A1* | 1/2015 | Allison | G11C 5/143 365/227 |
| 2015/0224975 A1* | 8/2015 | Martin | B60K 6/445 180/65.265 |
| 2015/0286524 A1 | 10/2015 | Trantham | |
| 2019/0042156 A1* | 2/2019 | De Santis | G06F 3/0604 |
| 2022/0399060 A1* | 12/2022 | Lu | G11C 16/28 |

FOREIGN PATENT DOCUMENTS

| | | | | |
|---|---|---|---|---|
| CN | 105556416 A | | 5/2016 | |
| CN | 107797946 A | | 3/2018 | |
| CN | 110023911 A | | 7/2019 | |
| CN | 107797946 B | * | 6/2021 | ............ G06F 12/16 |
| EP | 3 485 337 B1 | | 10/2020 | |
| GB | 2 550 049 A | | 11/2017 | |

OTHER PUBLICATIONS

Dahl et al. "Radiation evaluation of ferroelectric random access memory embedded in 180nm cmos technology." 2015 IEEE Radiation Effects Data Workshop (REDW). IEEE, 2015. Jul. 17, 2015 Retrieved on Sep. 14, 2021 from https://ieeexplore.ieee.org/abstract/document/7336729.

First Examination Report for Indian Application No. 202041036295 dated Mar. 1, 2022, partial English translation, 4 pages.

International Search Report and Written Opinion for International Application No. PCT/US2021/040663 mailing date Oct. 22, 2021, 12 pages.

Miron, "Using ferroelectric memory to enhance reliability of automotive systems", Digikey Tutorial article, Oct. 1, 2019. Retrieved on Sep. 19, 2021. Retrieved from URL: https://www.epdtonthenet.net/article/175412/Using-ferroelectric-memory-to-enhance-reliability-of-automotive-systems.aspx#.

Second Office Action issued for Chinese Patent Application No. 2021800523680, issued Aug. 5, 2025.

* cited by examiner

SYSTEMS AND METHODS FOR CRITICAL DATA SAVE IN ELECTRONIC CONTROL MODULES

CROSS REFERENCE TO RELATED APPLICATION

The present application claims priority to and the benefit of Indian Patent Application No. 202041036295, filed Aug. 24, 2020, which is incorporated herein by reference in its entirety.

TECHNICAL FIELD

The present disclosure relates to systems and methods for saving critical data in engine control modules.

BACKGROUND

Engine-powered systems and apparatuses (e.g., automotive systems) may include key switch controlled power and/or batteries. In an automotive system, an automotive battery is a rechargeable battery that supplies power in order to start the operation of the engine. Automotive key switch controlled power and/or batteries supply power to the engine of the vehicle throughout the operation of the vehicle. In engine- and battery-powered systems and apparatuses with electronically controlled components (e.g., in vehicles having an engine control module (ECM), an engine control unit (ECU) or a similar electronic component), unexpected power-down situations may result in the loss of critical ECM data. When power is unexpectedly lost, such as when a battery is removed before allowing an ECM to shut down properly, the ECM may not have enough time to execute data save operations.

SUMMARY

An example embodiment relates to a controller (e.g., an on-board vehicle controller). A controller for a vehicle includes at least one processor and at least one memory storing instructions that, when executed by the processor, cause the controller to perform various operations. The operations are to determine that a power loss to the controller has occurred and in response to the determination, save operating data to a ferroelectric random access memory (FRAM). According to various arrangements, the FRAM is included in and/or coupled to the controller (e.g., as a component on a circuit board of the controller, as a component on another circuit board separate from and communicatively coupled to the controller, etc.) In some arrangements, operations to determine that the power loss has occurred comprise determining that a power source structured to provide power to the controller is not operational. In some arrangements, the power source comprises a battery. In some arrangements, the power source comprises a capacitor. In some arrangements, operations to save operating data to the FRAM comprise comparing the operating data to a prior version of the operating data previously stored in the FRAM and, if it is determined that the operating data is different from the prior version, overriding the prior version previously stored in the FRAM with operating data. In some arrangements, the operating data comprises vehicle speed, engine speed, engine throttle power, acceleration, or the state of the acceleration pedal. In some arrangements, prior to determining that a power loss occurred, the controller is structured to perform operations to periodically save the operating data to the FRAM. In some arrangements, the FRAM is a dual-buffer FRAM.

Another example embodiment relates to a method for saving critical operating data of an engine control module (ECM), the method comprising determining that a power loss to the ECM has occurred, comprising determining that that a power source structured to provide power to the ECM is not operational, and in response to the determination, saving operating data to a ferroelectric random access memory (FRAM). According to various arrangements, the FRAM is included in and/or coupled to the controller (e.g., as a component on a circuit board of the controller, as a component on another circuit board separate from and communicatively coupled to the controller, etc.) In some arrangements, the power source comprises at least one of a battery and a capacitor. In some arrangements, operations to save operating data to the FRAM comprise comparing the operating data to a prior version of the operating data previously stored in the FRAM and, if it is determined that the operating data is different from the prior version, overriding the prior version previously stored in the FRAM with operating data. In some arrangements, the operating data comprises vehicle speed, engine speed, engine throttle power, acceleration, or the state of the acceleration pedal. In some arrangements, prior to determining that a power loss occurred, the ECM is structured to perform operations to periodically save the operating data to the FRAM. In some arrangements, the FRAM is a dual-buffer FRAM.

Another example embodiment relates to a non-transitory computer-readable media comprising computer-executable instructions stored thereon that, when executed by one or more processors, perform operations comprising determining that a power loss to the ECM has occurred, comprising determining that that a power source structured to provide power to the ECM is not operational, and in response to the determination, saving operating data to a ferroelectric random access memory (FRAM). According to various arrangements, the FRAM is included in and/or coupled to the controller (e.g., as a component on a circuit board of the controller, as a component on another circuit board separate from and communicatively coupled to the controller, etc.) In some arrangements, the power source comprises at least one of a battery and a capacitor. In some arrangements, operations to save operating data to the FRAM comprise comparing the operating data to a prior version of the operating data previously stored in the FRAM and, if it is determined that the operating data is different from the prior version, overriding the prior version previously stored in the FRAM with operating data. In some arrangements, the operating data comprises vehicle speed, engine speed, engine throttle power, acceleration, or the state of the acceleration pedal. In some arrangements, prior to determining that a power loss occurred, the ECM is structured to perform operations to periodically save the operating data to the FRAM. In some arrangements, the FRAM is a dual-buffer FRAM.

These and other features, together with the organization and manner of operation thereof, will become apparent from the following detailed description when taken in conjunction with the accompanying drawings.

DETAILED DESCRIPTION

Following below are more detailed descriptions of various concepts related to, and implementations of methods, apparatuses, and systems for saving critical data in engine control modules. The various concepts introduced herein may be implemented in any number of ways, as the concepts described are not limited to any particular manner of implementation. Examples of specific implementations and applications are provided primarily for illustrative purposes.

Referring to the Figures generally, the various embodiments disclosed herein relate to systems, apparatuses, and methods for saving critical data in engine control modules of a vehicle. A controller (e.g., an engine control module (ECM), engine control unit (ECU), etc.) for a vehicle includes at least one processor and at least one memory storing instructions that, when executed by the processor, cause the controller to perform various operations. The operations include determining that a power loss to the controller has occurred. The controller may be powered by an on-board battery and/or a capacitor (or other power source, such as an alternator). In response to the determination that the power loss has occurred, the operations including determining whether a key switch associated with an engine of the vehicle is on; and, when the key switch is on, save operating data to a ferroelectric random access memory (FRAM) coupled to the controller.

Figure 1:
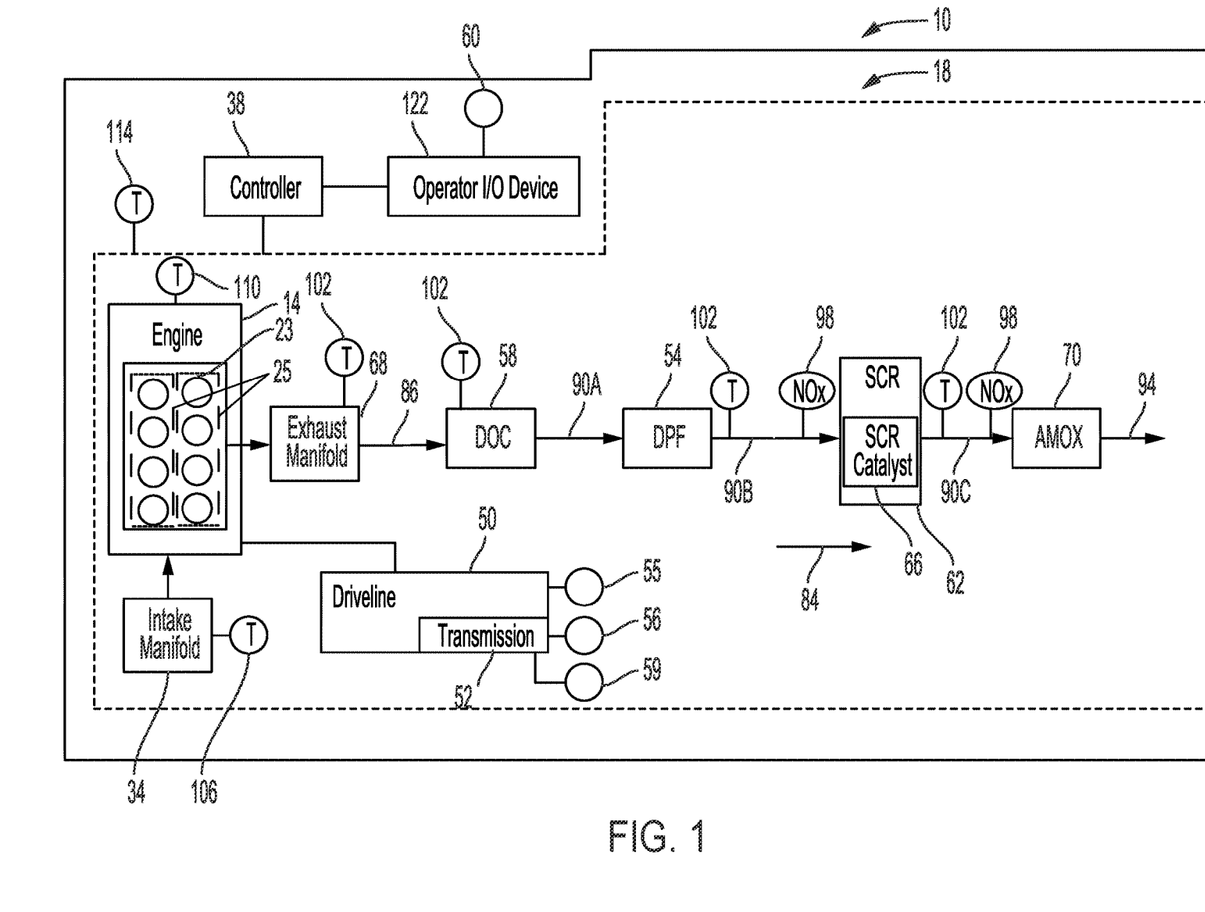
FIG. 1 is a schematic diagram of a vehicle having an engine coupled to an exhaust aftertreatment system and a controller, according to an example embodiment.

Referring now to FIG. 1, a vehicle having an engine coupled to an example exhaust aftertreatment system and a controller is depicted, according to an example embodiment. The vehicle 100 may be an on-road or an off-road vehicle including, but not limited to, line-haul trucks, mid-range trucks (e.g., pick-up trucks), tanks, airplanes, locomotives, various types of industrial equipment (excavators, backhoes, tractors, mowers, etc.), etc. In other embodiments, the vehicle 100 may be or include stationary equipment, such as gensets. The vehicle 100 generally includes an engine system 10 that includes an internal combustion engine 14, an exhaust aftertreatment system 18 in exhaust gas-receiving communication with the engine 14, a driveline 50 including a transmission 52, an operator input/output (I/O) device 122, and a controller 38 coupled to various components. Each of these components are described in more detail below.

According to one embodiment and as shown, the engine 14 is structured as a compression-ignition internal combustion engine that utilizes diesel fuel. The size/displacement of the engine 14 may vary based on the application (e.g., 30 L to 120 L). Further, the structure of the engine 14 may also vary (e.g., V6-style engine, V8, inline, etc.). In various alternate embodiments, the engine 14 may be structured as various other types of engine. Other examples of the engine 14 include, but are not limited to, other internal combustion engines (e.g., gasoline, natural gas), hybrid engines (e.g., a combination of an internal combustion engine and an electric motor), etc. In the example shown, the engine 14 includes a plurality of cylinders 23. The plurality of cylinders 23 may be arranged into one or more cylinder banks 25. In one example embodiment, the cylinders in the plurality of cylinders 23 are oriented in a V-configuration (e.g., as two cylinder banks 25 like shown).

The exhaust aftertreatment system 18 is in exhaust gas-receiving communication with some or each cylinder bank 25. As shown according to an example embodiment, the exhaust aftertreatment system 18 includes a diesel particulate filter (DPF) 54, a diesel oxidation catalyst (DOC) 58, a selective catalytic reduction (SCR) system 62 with an SCR catalyst 66, and an ammonia oxidation (AMOx) catalyst 70. The SCR system 62 may further include a reductant delivery system that has a diesel exhaust fluid (DEF) source that supplies DEF to a DEF doser via a DEF line. One of skill in the art will appreciate that an exemplary embodiment is discussed herein, and various components of the aftertreatment system 18 may be rearranged, combined, and/or omitted.

In operation and according to an example embodiment, combustion air enters the engine system 14 through an engine intake manifold 34 and flows to the plurality of cylinders 23. The engine 14 combusts the air and fuel to create power to propel the vehicle 100. The combustion gases (i.e., exhaust gases) are then vented away from the cylinders 23. In exhaust flow direction as indicated by directional arrow 84, exhaust gas flows from the engine 14 into inlet piping 86 of the exhaust aftertreatment system 18. From the inlet piping 86, the exhaust gas flows into the DOC 58 and exits the DOC 58 into a first section of exhaust piping 90A. From the first section of exhaust piping 90A, the exhaust gas flows into the DPF 54 and exits the DPF 54 into a second section of exhaust piping 90B. From the second section of exhaust piping 90B, the exhaust gas flows into the SCR catalyst 66 and exits the SCR catalyst 66 into the third section of exhaust piping 90C. As the exhaust gas flows through the second section of exhaust piping 90B, it may be periodically dosed with DEF by a DEF doser. Accordingly, the second section of exhaust piping 90B may also act as a decomposition chamber or tube to facilitate the decomposition of the DEF or another reductant to ammonia. From the third section of exhaust piping 90C, the exhaust gas flows into the AMOx catalyst 70 and exits the AMOx catalyst 70 into the outlet piping 94 before the exhaust gas is expelled from the exhaust aftertreatment system 18. Based on the foregoing, in the illustrated embodiment, the DOC 58 is positioned upstream of the DPF 54 and the SCR catalyst 66, and the SCR catalyst 66 is positioned downstream of the DPF 54 and upstream of the AMOx catalyst 70. However, in alternative embodiments, other arrangements of the components of the exhaust aftertreatment system 18 are also possible (e.g., the AMOx catalyst 70 may be excluded from the exhaust aftertreatment system 18, the relative positioning of the components may differ, etc.).

The DOC 58 may have any of various flow-through designs. Generally, the DOC 58 is structured to oxidize at least some particulate matter, e.g., the soluble organic fraction of soot, in the exhaust and reduce unburned hydrocarbons and CO in the exhaust to less environmentally harmful compounds. The DPF 54 may be any of various flow-through designs, and is structured to reduce particulate matter concentrations, e.g., soot and ash, in the exhaust gas to, e.g., meet one or more requisite emission standards.

As discussed above and in this example configuration, the SCR system 62 may include a reductant delivery system with a DEF source, a pump, and a doser (not shown). The SCR catalyst 66 may be any of various known catalysts. For example, in some implementations, the SCR catalyst 66 is a vanadium-based catalyst, and in other implementations, the SCR catalyst is a zeolite-based catalyst, such as a Cu-Zeolite or a Fe-Zeolite catalyst. The AMOx catalyst 70 may be any of various flow-through catalysts configured to react with ammonia to produce mainly nitrogen. As briefly described above, the AMOx catalyst 70 is structured to remove ammonia that has slipped through or exited the SCR catalyst 66 without reacting with NOx in the exhaust. In certain instances, the exhaust aftertreatment system 18 can be operable with or without an AMOx catalyst. Further, although the AMOx catalyst 70 is shown as a separate unit from the SCR catalyst 66 in FIG. 1, in some implementations, the AMOx catalyst 70 may be integrated with the SCR catalyst 66, e.g., the AMOx catalyst 70 and the SCR catalyst 66 can be located within the same housing.

As alluded to above, although the exhaust aftertreatment system 18 shown includes one of an DOC 58, DPF 54, SCR catalyst 66, and AMOx catalyst 70 positioned in specific locations relative to each other along the exhaust flow path, in other embodiments, the exhaust aftertreatment system 18 may include more than one of any of the various catalysts, less components, and/or the relative positions may differ. Further, although the DOC 58 and AMOx catalyst 70 are non-selective catalysts, in some embodiments, the DOC 58 and AMOx catalyst 70 can be selective catalysts.

The vehicle 100 is also shown to include a driveline 50, which includes a transmission 52. The driveline 50 may comprise various additional components (not shown), including a driveshaft, axles, wheels, etc. Transmission 52 receives power from the engine 14 and provides rotational power to a final drive (e.g., wheels) of the vehicle 100. In some embodiments, the transmission 52 is a continuously variable transmission (CVT). In other embodiments, the transmission 52 is a geared transmission comprising a plurality of gears. The transmission 52 may be an automatic, manual, automatic manual, etc. type of transmission. The transmission 52 may include one or more sensors (virtual or real) that couple to the controller 38 and provide information or data regarding operation of the transmission 52 (e.g., the current gear or operating mode, a temperature in the transmission box, etc.).

The operator I/O device 122 is coupled to the controller 38, such that information may be exchanged between the controller 38 and the operator I/O device 122, wherein the information may relate to one or more components of FIG. 1 or determinations/commands/instructions/etc. (described below) of the controller 38. The operator I/O device 122 enables an operator of the vehicle 100 (or another passenger) to communicate with the controller 38 and one more components of the vehicle 100 and components of FIG. 1. The operator I/O device 122 may include a steering wheel, a joystick, an accelerator pedal, a brake pedal, etc. Additionally, the operator I/O device 122 may include an interactive display, a touchscreen device, one or more buttons and switches, voice command receivers, etc. Via the operator I/O device 122, the controller 38 may receive and provide various commands, data, and information concerning the operations described herein.

The vehicle 100 is also shown to include various sensors. The sensors may be strategically disposed throughout the vehicle 100. For example, the engine intake manifold temperature sensor 106 can be positioned at or proximate to the engine intake manifold 34 of the engine system 10 to detect a temperature of air entering the engine system 10. The engine coolant temperature sensor 110 can be strategically positioned to determine a temperature of the engine coolant of the engine 14.

Sensors may also be strategically disposed throughout the exhaust aftertreatment system 18 and in or proximate to the external environment. The sensors may be in communication with the controller 38 to monitor operating conditions of the engine system 10 and monitor various environmental conditions. Aftertreatment system-related sensors can include NOx sensors 98 and temperature sensors 102 positioned within the exhaust aftertreatment system 18, an engine intake manifold temperature sensor 106, and an ambient (e.g., outdoor) temperature sensor 114. In this regard, the controller 38 may receive data from the one or more sensors. As shown, the temperature sensors 102 are associated with the SCR catalyst 66, the exhaust manifold 68, the DOC 58, and the DPF 54. Therefore, temperature data indicative of the temperature of each of these components may be tracked and monitored. For example and regarding the SCR catalyst 66, the temperature sensors 102 are strategically positioned to detect the temperature of exhaust gas flowing into and out of the SCR catalyst 66.

As alluded to above with respect to the transmission 52, sensors may be strategically disposed throughout the driveline 50. The sensors coupled to the driveline 50 may include a ground speed sensor 55 structured to determine the ground speed of the vehicle 100, a vehicle weight sensor 56 structured to determine the weight of the vehicle 100, and/or a transmission position sensor 59 structured to determine a transmission state (e.g., forward, reverse, neutral, a selected gears, etc.) of the vehicle 100. Sensors may also be strategically disposed throughout the operator input/output (I/O) device 122. For example, the operator I/O device 122 may include an accelerator pedal and may be associated with an accelerator pedal position sensor 60. Sensors may further include pressure sensors, accelerometers, etc.

The controller 38 is structured to control, at least partly, operation of the engine system 10 and associated subsystems, such as the internal combustion engine 14, the exhaust aftertreatment system 18, the driveline 50, and/or the operator I/O device 122. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network ("CAN") bus provides the exchange of signals, information, and/or data. The CAN bus includes any number of wired and wireless connections. Because the controller 38 is communicably coupled to the systems and components of FIG. 1, the controller 38 is structured to receive data from one or more of the components shown in FIG. 1 and/or FIG. 2. For example, the data may include vehicle operating data (e.g., accelerator pedal position, requested torque, engine speed, vehicle speed, engine temperature, etc.) received via one or more sensors and/or determined by the controller based on information received from the sensors, and so on. The structure and function of the controller 38 is further described in regard to FIG. 2.

Figure 2:
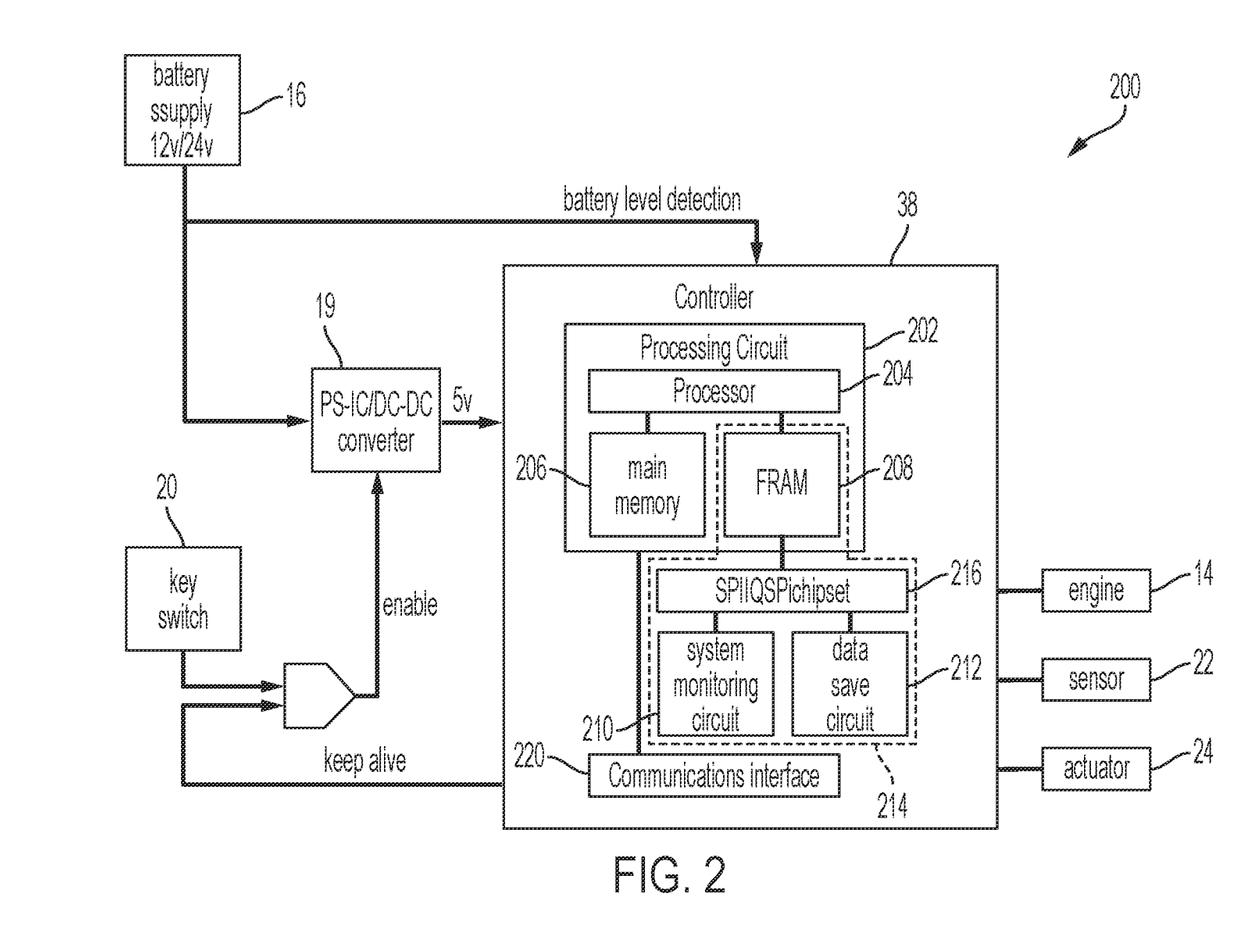
FIG. 2 is a schematic representation of a system architecture for saving critical data by the controller of FIG. 1, according to an example embodiment.

Referring now to FIG. 2, a schematic representation of a system architecture 200 for saving critical data by controller 38 of FIG. 1 is shown, according to an example embodiment. The system architecture 200 allows operations for saving, recovering, and/or managing critical data and the corresponding rapid access non-volatile memory, such as one or more ferroelectric random access memory modules (FRAM) 208. According to various embodiments, the operations can include initial data save operations, such as detecting a power loss event (e.g., battery removal, key switch off, etc.), triggering a data transfer to save data to the rapid access non-volatile media (e.g., FRAM 208), and/or causing the controller 38 to release a power down signal. The operations can also include subsequent data and memory management operations, including, for example, restoration of data from the rapid access non-volatile media (e.g., FRAM 208), preparation of the rapid access non-volatile media (e.g., FRAM 208) for subsequent read/write operations, battery detection and key switch operations, monitoring operating conditions associated with the vehicle to determine that the vehicle is running, and/or carrying out periodic data saves/updates in the rapid access non-volatile media (e.g., FRAM 208).

The system architecture 200 may be part of an on-board electronic control system of the vehicle 10. As shown, the system architecture 200 includes an engine 14, a battery 16, a converter 19, a key switch 20, sensor(s) 22, actuator(s) 24, and a controller 38. In some embodiments, the controller 38 is an engine control module (ECM), also sometimes known as an engine control unit (ECU).

As shown, the system architecture 200 includes a battery 16 and a converter 19. In the example embodiment, the battery 16 is a rechargeable automotive battery structured supply power to various components of the system architecture 200, including the controller 38. According to various embodiments, the battery 16 may be a lithium-ion battery, a lithium-air battery, a lithium-sulfur battery, etc. As shown, the battery 16 may be a 12-volt battery. In some embodiments, multiple lower-voltage batteries (e.g., two 12-volt batteries) are connected in a series to provide a 24-volt power supply. The battery 16 can be disposed in a battery terminal that is electrically coupled to the converter 19 via a suitable connector. As shown, the converter 19 is a power converter structured to convert the power source voltage generated by the battery 16 (e.g., 12 volt, 24 volt, etc.) to the circuit supply voltage suitable to power the controller 38 and/or various components thereof (e.g., 3.3 volt, 5 volt, etc.).

As shown, the system architecture 200 includes a key switch 20. In an example embodiment, the key switch 20 is a power-on switch for the engine 14. For example, an operator may insert a key and rotate the key to complete a circuit thereby causing an alternator or other electrified power source (battery) to crank a starter motor and start the engine. In other embodiments, a push button starter may be used where the user pushes a button to start the engine.

As shown, the system architecture 200 includes controller 38. Controller 38 is structured to control at least some operations of one or more systems of the vehicle, such as the engine 14, the battery 16, the converter 19, the key switch 20, the sensor(s) 22, the actuator(s) 24, etc. The controller 38 may be or may be coupled to an engine control unit or various other types of electronic control units for a vehicle. In some embodiments, the controller 38 is a singular unit. In other embodiments, the vehicle 100 comprises multiple vehicle controllers 38. In this regard, various circuits of the controller 38, discussed below, may be dispersed in separate physical locations of the vehicle.

As shown, the controller 38 includes a processing circuit 202. The processing circuit 202 includes a processor 204, a main memory device 206, a rapid access non-volatile memory (FRAM) 208, a system monitoring circuit 210, a data save circuit 212, an SPI/QSPI chipset 216, and a communications interface 220. The FRAM 208, system monitoring circuit 210, data save circuit 212 and the SPI/QSPI chipset 216 comprise the battery detection and key switch detection circuit 214.

The processing circuit 202 may be structured or configured to execute or implement the instructions, commands, and/or control processes described herein with respect to the various circuits, such as the system monitoring circuit 210, data save circuit 212, and/or the battery detection and key switch detection circuit 214. Thus, the depicted configuration represents these circuits being embodied as machine or computer-readable media, which may be stored by the main memory device 206. However, this illustration is not meant to be limiting as the present disclosure contemplates other embodiments where at least one of the circuits is configured as a hardware unit. All such combinations and variations are intended to fall within the scope of the present disclosure.

The processor 204 may be implemented as a single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A processor may be a microprocessor, or any conventional processor, or state machine. The processor 204 also may be implemented as a combination of computing devices, such as a combination of a digital signal processor (DSP) and a microprocessor, a plurality of microprocessors, one or more microprocessors in conjunction with a DSP core, or any other such configuration. In some embodiments, the one or more processors may be shared by multiple circuits may comprise or otherwise share the same processor which, in some example embodiments, may execute instructions stored, or otherwise accessed, via different areas of the main memory device 206 and/or the FRAM 208. Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The main memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The main memory device 206 may be coupled to the processor 204 to provide computer code or instructions to the processor 204 for executing at least some of the processes described herein. Moreover, the main memory device 206 may be or include tangible, non-transient volatile memory or non-volatile memory. Accordingly, the main memory device 206 may include database components, object code components, script components, or any other type of information structure for supporting the various activities and information structures described herein.

The FRAM 208 may include one or more rapid access non-volatile memory cells, such as one or more ferroelectric random access memory cells. Advantageously, the FRAM 208 supports fast read/write operations and is structured to retain saved data under power-off conditions. In an example embodiment, FRAM 208 memory cell may comprise a ferroelectric semiconductor layer and/or a ferroelectric insulator layer (e.g., lead zirconate titanate, etc.) disposed on a silicon substrate. According to various embodiments, the FRAM 208 may be structured to interface to various circuits, such as the system monitoring circuit 210, data save circuit 212, and/or the battery detection and key switch detection circuit 214, via the SPI/QSPI chipset 216. The system monitoring circuit 210, data save circuit 212, and/or the battery detection and key switch detection circuit 214 may initiate read/write operations to the FRAM 208 to save critical data (e.g., vehicle operating parameters, etc.) on shutdown. The system monitoring circuit 210, data save circuit 212, and/or the battery detection and key switch detection circuit 214 may include one or more memory devices for storing instructions that are executable by the processor 204. For example, the battery detection and key switch detection circuit 214 may include the FRAM 208 and the SPI/QSPI chipset 216. The structure and operations of these circuits are described in further detail herein.

In an example embodiment, the controller 38 may be structured to electronically monitor and control various subsystems in the vehicle. As shown, the system architecture 200 includes sensor(s) 22 and actuator(s) 24. The controller 38 is coupled and, particularly electrically coupled, to the sensor(s) 22 and is structured to receive data collected by the sensor(s) 22. In an example embodiment, the sensor(s) 22 are physical or virtual (e.g., composite or multifactorial) sensors that are structured to collect information regarding vehicle operation, including rail pressure (e.g., common rail direct fuel injection pressure in direct injection engines), vehicle speed, engine speed, engine throttle power, acceleration, the state of the acceleration pedal, etc. The controller 38 is further electrically coupled to the actuator(s) 24 and is structured to generate electronic commands to cause actuator(s) 24 to perform various operations. The actuator(s) 24 may include vehicle control actuators structured to convert electrical signals generated or passed along by the controller 38 to physical actions in brake systems, steering systems, engine control systems, etc. In an example embodiment, the controller 38 is communicatively coupled to the battery detection and key switch detection circuit 214 and is structured to exchange data and electronic instructions therewith. In some embodiments, the controller 38 may be structured to propagate (i.e. to the appropriate actuator(s) 22, etc.) electronic commands generated by the battery detection and key switch detection circuit 214 according to the shutdown and data save logic implemented by the battery detection and key switch detection circuit 214.

The battery detection and key switch detection circuit 214 is structured to manage the data save and restore operations. These operations may include initial data save operations, such as detecting a power loss event (e.g., battery removal, key switch off, etc.), triggering a data transfer to save data to FRAM 208 via the SPI/QSPI chipset 216, and/or causing the controller 38 to release a power down signal. The operations can also include subsequent data and memory management operations, including, for example, restoration of data from the FRAM 208 and data transfer to the main memory device 206, preparation of the FRAM 208 for subsequent read/write operations, activation of the battery detection and key switch operations, monitoring (e.g., by using the data supplied by various sensors) operating conditions associated with the vehicle to determine that the vehicle is running, and/or carrying out periodic data saves/ updates in the FRAM 208.

According to various embodiments, the above operations may be performed by the system monitoring circuit 210 and/or the data save circuit 212. In some embodiments, the system monitoring circuit 210 is structured to detect a power loss event relating to the power source structured to power the controller 38. The power source may comprise a battery, a capacitor, etc. In some embodiments, the system monitoring circuit 210 is structured to determine the state of the key switch 20 associated with the engine 14 so that various FRAM 208 management and data save operations may be performed depending on the state thereof. In some embodiments, the system monitoring circuit 210 is structured to receive various operating parameters associated with operation of the vehicle and initiate particular FRAM 208 management and/or data save operations based on values of these parameters, as described further herein. In some embodiments, the data save circuit 212 is structured to perform media management operations for the FRAM 208, save data to the FRAM 208, retrieve data from the FRAM 208, and/or validate the data previously saved to the FRAM 208 during a prior shutdown event, as described further herein.

In one configuration, the system monitoring circuit 210, data save circuit 212, and/or the battery detection and key switch detection circuit 214 are embodied as machine or computer-readable media storing instructions that are executable by a processor, such as processor 204. As described herein and amongst other uses, the machine-readable media facilitates performance of certain operations to enable reception and transmission of data. For example, the machine-readable media may store and provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple processors. In the latter scenario, the processors may be connected to each other through a suitable type of network (e.g., CAN bus, etc.).

In another configuration, the system monitoring circuit 210, data save circuit 212, and/or the battery detection and key switch detection circuit 214 are embodied as hardware units, such as electronic control units. As such, some or all of these circuits may be embodied as one or more circuitry components including, but not limited to, processing circuitry, network interfaces, peripheral devices, input devices, output devices, sensors, etc. In some embodiments, the system monitoring circuit 210, data save circuit 212, and/or the battery detection and key switch detection circuit 214 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the controller 38, system monitoring circuit 210, data save circuit 212, and/or the battery detection and key switch detection circuit 214 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The system monitoring circuit 210, data save circuit 212, and/or the battery detection and key switch detection circuit 214 may also include programmable hardware devices such as field programmable gate arrays, programmable array logic, programmable logic devices or the like.

The communications interface 220 is structured to enable the controller 38 to communicate with in-vehicle components such as a fuel injector(s) as well as external systems, such as remote systems that are a part of a telematics system. The communications interface 220 may include wired and/or wireless interfaces (e.g., jacks, antennas, transmitters, receivers, transceivers, wire terminals, etc.) for conducting data communications with/over these various systems, devices, or networks. For example, the communications interface 220 may include a Wi-Fi transceiver for communicating via a wireless communications network. The communications interface 220 may be structured to communicate via local area networks or wide area networks (e.g., the Internet, etc.) and may use a variety of communications protocols (e.g., TCP/IP, local operating network (LON), controller area network (CAN), J1939, local interconnect network (LIN), Bluetooth, ZigBee, radio, cellular, near field communication, etc.).

Figure 3:
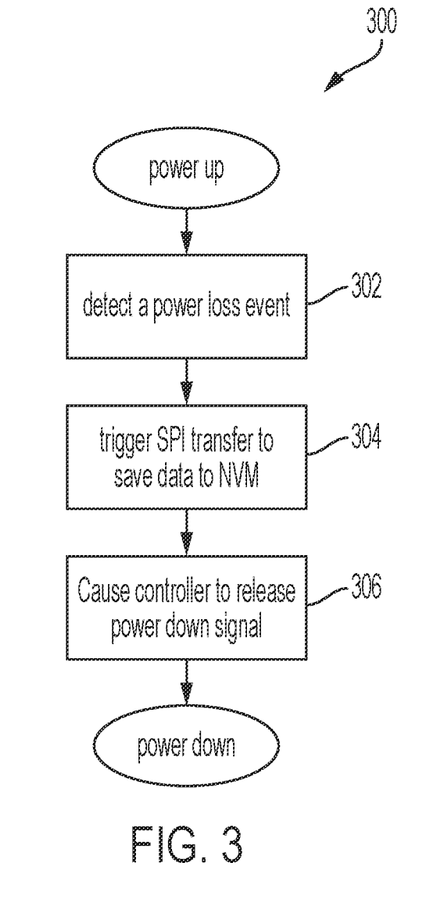
FIG. 3 is a flow diagram of a method of saving critical data, performed during an initial shut-down event, to non-volatile memory associated with the controller of FIG. 1, according to an example embodiment.

Referring now to FIG. 3, a flow diagram of a method 300 of saving critical data, performed during an initial shut-down event, to non-volatile memory associated with the controller of FIG. 1, is shown according to an example embodiment. The method 300 may be carried out by the components of FIG. 2, such that reference may be made to these components to aid explanation of method 300. At a high level and according to an example embodiment, the method 300 includes detecting a power loss event (e.g., battery removal, key switch off, etc.), triggering a data transfer to save data to the rapid access non-volatile media (e.g., FRAM 208 of FIG. 2), and/or causing the controller 38 to release a power down signal. Advantageously, the method 300 allows the vehicle to save critical data even if power supply is disrupted. For example, while power to the controller 38 from the battery supply 16 may be disrupted, the circuitry may still remain operational for a short period of time via keep-alive procedures (e.g., by drawing power from a secondary battery, a capacitor, or another on-board power source).

At 302, the method 300 is shown to detect a power loss event. In some embodiments, the system monitoring circuit 210 of FIG. 2 is structured to comprise computer-executable instructions to continuously or periodically (e.g., at predetermined time intervals) monitor the state of the battery 16 and/or the key switch 20 shown in FIG. 2. The power to the controller 38 of FIG. 2 may be disrupted while the vehicle is in operation such that the vehicle will come to a halt. Accordingly, the system monitoring circuit 210 may detect that the key switch 20 is in the "off" state. In this scenario, the controller 38 of FIG. 2 may receive power through an alternative power source, such as the battery 16, and power may flow from the battery 16 via the converter 19 to various components of the controller 38. However, the flow of power from the alternative power source may be disrupted as well. For example, the battery 16 may have failed or may have been removed. In some embodiments, the system monitoring circuit 210 receives a fault code and/or generates a fault code based on information received from one or more sensors, and, based on the received information and/or the fault code, determines that the battery 16 is in an "off" state and therefore a power loss event has occurred. Conventionally, when this occurs (that is, when both the key switch 20 and the battery 16 are in an "off" state), critical data may not be saved to any type of rapid access non-volatile memory. In the embodiment of method 300, however, the system monitoring circuit 210 proceeds to save the data at 304, as discussed below.

If a power loss event is detected at 302, then, at 304, the data save circuit 212 of FIG. 2 may trigger data save operations to the rapid access non-volatile memory, such as FRAM 208. For example, the data save circuit 212 may identify current operating parameters associated with the engine 14, sensor 22, actuator 24 or controller 38 of FIG. 2 and save the data values for all or some of these operating parameters to the FRAM 208. The data values may include information supplied by the engine 14, sensor(s) 22 and/or actuators 24. For example, the data values may include rail pressure, vehicle speed, engine speed, engine throttle power, acceleration, the state of the acceleration pedal, etc. The FRAM 208 may be accessed and the read/write operations to the FRAM 208 may be performed via the SPI/QSPI chipset 216 shown in FIG. 2 to save the data values. Advantageously, because FRAM 208 is used, the power-down data save time is reduced to the sub-milliseconds range.

At 306, the method 300 is shown to include causing the controller 38 or a component thereof to release a power down signal once the data has been saved to the FRAM 208. For example, in some embodiments, the system monitoring circuit 210 may determine that the data save operations have been completed at 304. The system monitoring circuit 210 may transmit electronic commands to various components of the vehicle (e.g., the engine 14) to initiate their respective shutdown procedures.

Figure 4:
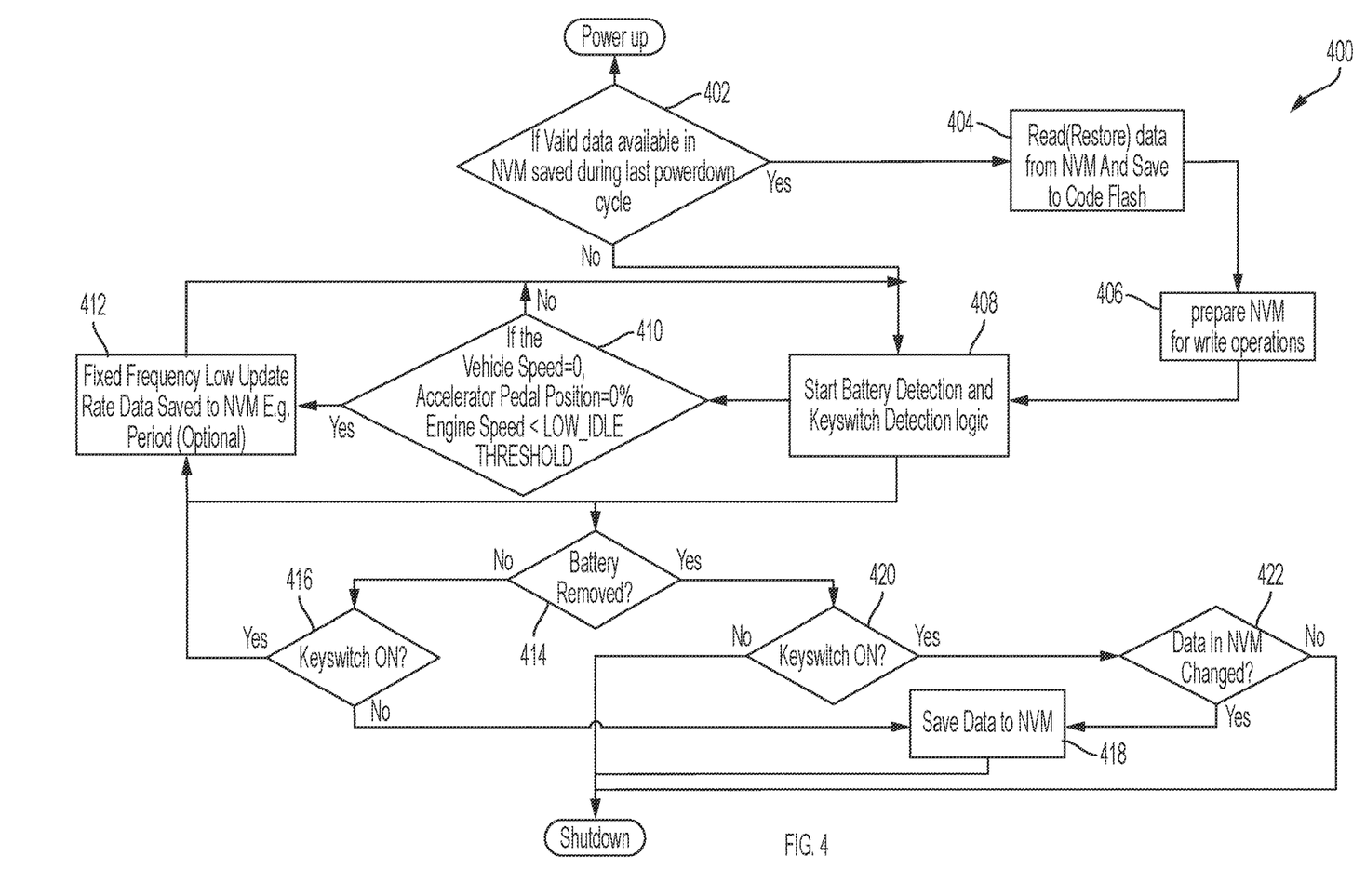
FIG. 4 is a flow diagram of a method of restoring previously saved critical data and saving critical data during subsequent shut-down events to non-volatile memory associated with the controller of FIG. 1, according to an example embodiment.

Referring now to FIG. 4, a flow diagram of a method 400 of restoring previously saved critical data and saving critical data during subsequent shut-down events to non-volatile memory associated with the controller of FIG. 1, is shown according to an example embodiment. The method 400 may be carried out by the components of FIG. 2, such that reference may be made to these components to aid explanation of method 300.

At a high level and according to an example embodiment, the method 400 includes operations for managing critical data saved to the FRAM 208 of FIG. 2, such as rail pressure, vehicle speed, engine speed, engine throttle power, acceleration, the state of the acceleration pedal, etc. As a summary overview, the method 400 includes operations to transfer any previously saved data from the FRAM 208 to the main memory 206, prepare the FRAM 208 for subsequent write operations, and, as long as the battery 16 is in an "on" state, periodically save updated data to the FRAM 208. Advantageously, this makes a snapshot of operating data available for subsequent retrieval if a power down event unexpectedly occurs. The operations further include various data management operations performed depending on the state of the battery 16 and the key switch 20, which are monitored throughout the operation of the method 400. If the battery 16 is "on" and the key switch 20 is "on", then the updated critical data continues to be periodically saved to the FRAM 208. If the battery 16 is "on" and the key switch 20 is "off", then the most recent available copy of critical data is saved to the FRAM 208 and the system is shut down. If the battery 16 is "off" and the key switch 20 is "on", then the most recent available copy of critical data is saved to the FRAM 208 if it is determined that the most recent data values have changed from the data previously saved to the FRAM 208, and the system is shut down. If the battery 16 is "off" and the key switch 20 is "off", the system is shut down and the FRAM 208 retains the data that was periodically saved and updated while the system was in operation. These operations are described in further detail below, according to an example embodiment.

At 402, the method 400 is shown to include computer-executable operations to determine if valid data has been previously saved to the FRAM 208 during the last power-down cycle. The operations at 402 are executed by the data save circuit 212, which may be structured to access the FRAM 208, retrieve the previously saved data, and perform data integrity and/or validation operations on the previously saved data. If the determination is affirmative, then the method 400 proceeds to operations at 404. If the determination is negative (i.e. the data is found to be invalid at power-up), then the method 400 proceeds to operations at 408.

At 404, the method 400 is shown to include computer-executable operations to save the power-down data determined to be valid. The operations at 404 are executed by the data save circuit 212. In some embodiments, the data save circuit 212 may be structured to read the data from the FRAM 208 and save the data to the main memory 206 shown at FIG. 2, which may include flash memory. In other embodiments, such as when FRAM 208 implements a double buffer, the operations to transfer the data to the main memory 206 may be omitted such that two copies of critical data from two most recent shutdown events are available on the next power-up event.

At 406, the method 400 is shown to include computer-executable operations to prepare the FRAM 208 for read/write operations. The operations at 406 are executed by the data save circuit 212, which may be structured to prepare the FRAM 208 by clearing a particular area within the FRAM 208 (e.g., by erasing the data corresponding to a particular buffer or by erasing all of the data from the FRAM 208.)

At 408, the method 400 is shown to include computer-executable operations to perform the battery detection and key switch detection operations. The operations at 408 are executed by the system monitoring circuit 210 of the battery detection and key switch detection circuit 214, which may be structured to receive data and/or electrical signals from various components of the vehicle, such as the engine 14, sensor(s) 22, actuator(s) 24, etc. The operations at 408 may include monitoring vehicle operating parameters, monitoring the state of the battery 16, monitoring the state of the key switch 20, etc.

The method 400 may include operations at 410 and 412. Generally, these operations allow the system to periodically monitor vehicle operating parameters and periodically save critical data to FRAM 208 before a power loss event has not been detected such that up-to-date data is available if the key switch 20 is turned off and the battery power has been lost.

At 410, the method 400 is shown to include computer-executable operations to determine the current values for at least some system parameters. The operations at 410 are executed by the system monitoring circuit 210, which may be structured to receive various operating parameters directly from their source components (e.g., the engine 14, sensor(s) 22, actuator(s) 24). The data may include various parameters, such as rail pressure, vehicle speed, engine speed, engine throttle power, acceleration, the state of the acceleration pedal, etc. As shown, in one embodiment, at 410, if a determination is made that certain operating parameters meet certain thresholds, then the method 400 proceeds to operations at 412. As shown, the method 400 may proceed to save data to the FRAM 208 at 412 if it is determined by the system monitoring circuit 210 that the vehicle speed is 0 mph, the accelerator pedal position is 0%, and/or the engine speed is lower than the low idle threshold. In an example embodiment, the low idle threshold is 800 rpm for on-highway vehicles and 900 rpm for off-highway vehicles.

In some embodiments, the decisional at 410 is omitted such that critical data is saved at predetermined time intervals. According to various embodiments, each data save operation takes place within (at or under) 1 millisecond.

At 412, the method 400 is shown to include computer-executable operations to save the operational data to the FRAM 208. The operations at 412 are executed by the data save circuit 212, which may override the previously saved values corresponding to particular operating parameters.

At 414, the method 414 is shown to include computer-executable operations to determine if the battery 16 is in the "off" state—for example, if the battery 16 has been removed. The operations at 414 are executed by the system monitoring circuit 210, which may be structured to receive and/or generate a fault codea and, based on the fault code, determine that the battery 16 is in an "off" state and therefore a power loss event has occurred. If the determination is negative, the method 400 proceeds to the operations at 416. If the determination is affirmative, the method 400 proceeds to the operations at 420.

At 416, the method 400 is shown to include computer-executable operations executed if it is determined at 414 that the battery 16 is in an "on" state. The operations at 416 are executed by the system monitoring circuit 210, which may be structured to determine if the key switch 20 is in an "on" state. In some embodiments, the system monitoring circuit 210 may receive key switch data. If it is determined that the key switch is "on", then the method 400 proceeds to the operations at 412 to save the operational data to the FRAM 208, and then to the operations at 408 and 414 to continue monitoring the state of the battery 16. If it is determined that the key switch is "off", the method 400 proceeds to the operations at 418.

At 418, the method 400 is shown to include computer-executable operations to save critical data to FRAM 208. The operations at 402 are executed by the data save circuit 212, which may be structured to trigger data save operations to the FRAM 208. For example, the data save circuit 212 may identify current operating parameters associated with the engine 14, sensor 22, actuator 24 or controller 38 of FIG. 2 and save the data values for all or some of these operating parameters to the FRAM 208. The data values may include information supplied by the engine 14, sensor(s) 22 and/or actuators 24. For example, the data values may include rail pressure, vehicle speed, engine speed, engine throttle power, acceleration, the state of the acceleration pedal, etc. The FRAM 208 may be accessed and the read/write operations to the FRAM 208 may be performed via the SPI/QSPI chipset 216 shown in FIG. 2 to save the data values.

At 420, the method 400 is shown to include computer-executable operations executed if it is determined at 414 that the battery 16 is in an "off" state. The operations at 420 are executed by the system monitoring circuit 210, which may be structured to determine if the key switch 20 is in an "on" state. If it is determined that the key switch is "on", then the method 400 proceeds to the operations at 422. If it is determined that the key switch is "off", then the method 400 proceeds to cause the controller 38 to release a power down signal.

At 422, the method 400 is shown to include computer-executable operations to determine if the previously saved data in the FRAM 208 has changed. The operations at 422 are executed by the data save circuit 212, which may be structured to retrieve the most recently saved data from the FRAM 208 and compare this data to a current snapshot of operating data. For example, the data values may include rail pressure, vehicle speed, engine speed, engine throttle power, acceleration, the state of the acceleration pedal, etc. The FRAM 208 may be accessed and the read/write operations to the FRAM 208 may be performed via the SPI/QSPI chipset 216 shown in FIG. 2 to save the most current data values, as shown at 418. Once these operations are performed, the method 400 proceeds to cause the controller 38 to release a power down signal.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional high members. For example, circuit A communicably "coupled" to circuit B may signify that circuit A communicates directly with circuit B (i.e., no intermediary) or communicates indirectly with circuit B (e.g., through one or more intermediaries).

While various circuits with particular functionality are shown in FIG. 2, it should be understood that the controller 38 may include any number of circuits for completing the functions described herein. For example, the activities and functionalities of the circuits may be combined in multiple circuits or as a single circuit. Additional circuits with additional functionality may also be included. Further, the controller 38 may further control other activity beyond the scope of the present disclosure.

As mentioned above and in one configuration, the "circuits" may be implemented in machine-readable medium for execution by various types of processors. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example, the one or more processors may be a remote processor (e.g., a cloud based processor). Alternatively, or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A controller for a vehicle comprising at least one processor and at least one memory storing instructions that, when executed by the processor, cause the controller to:
   receive an indication of a power loss event to the controller based on a battery of the vehicle being in an off state;
   determine a state of a switch, the switch associated with electrical power to start an engine of the vehicle;
   in response to the power loss event and the state of the switch being on to enable electrical power to start the engine of the vehicle, save operating data to a ferroelectric random access memory (FRAM); and
   in response to the power loss event and the state of the switch being off, releasing a power down signal to at least one component of the vehicle to initiate a shutdown process for the at least one component.

2. The controller of claim 1, wherein the battery is a power source for the controller, and wherein the off state of the battery is based on the battery being not operational.

3. The controller of claim 1, wherein operations to save operating data to the FRAM comprise comparing the operating data to a prior version of the operating data previously stored in the FRAM and, if it is determined that the operating data is different from the prior version, overriding the prior version previously stored in the FRAM with operating data.

4. The controller of claim 1, wherein the operating data comprises vehicle speed, engine speed, engine throttle power, acceleration, or a state of an acceleration pedal of the vehicle.

5. The controller of claim 1, wherein prior to receiving the indication of the power loss event, the controller is structured to perform operations to periodically save the operating data to the FRAM.

6. The controller of claim 1, wherein the FRAM is a dual-buffer FRAM.

7. A method for saving critical operating data of an engine control module (ECM), the method comprising:
receiving an indication of a power loss event to the ECM based on a power source structured to provide power to the ECM being not operational;
determine a state of a switch, the switch associated with electrical power to start an engine of a vehicle;
in response to the power loss event and the state of the switch being on to enable electrical power to start the engine of the vehicle including the ECM, saving operating data to a ferroelectric random access memory (FRAM); and
in response to the power loss event and the state of the switch being off, releasing a power down signal to at least one component of the vehicle to initiate a shutdown process for the at least one component.

8. The method of claim 7, wherein the power source comprises at least one of a battery and a capacitor.

9. The method of claim 7, wherein operations to save operating data to the FRAM comprise comparing the operating data to a prior version of the operating data previously stored in the FRAM and, if it is determined that the operating data is different from the prior version, overriding the prior version previously stored in the FRAM with operating data.

10. The method of claim 7, wherein the operating data comprises vehicle speed, engine speed, engine throttle power, acceleration, or a state of an acceleration pedal of the vehicle.

11. The method of claim 7, wherein prior to receiving the indication of the power loss event, the ECM is structured to perform operations to periodically save the operating data to the FRAM.

12. The method of claim 7, wherein the FRAM is a dual-buffer FRAM.

13. A non-transitory computer-readable media comprising computer-executable instructions stored thereon that, when executed by one or more processors, perform operations comprising:
receiving an indication of a power loss event to an electronic control module (ECM) based on a power source structured to provide power to the ECM being not operational;
determining a state of a switch, the switch associated with electrical power to start an engine of a vehicle;
in response to the power loss event and the state of the switch being on to enable electrical power to start the engine of the vehicle including the ECM, saving operating data to a ferroelectric random access memory (FRAM); and
in response to the power loss event and the state of the switch being off, releasing a power down signal to at least one component of the vehicle to initiate a shutdown process for the at least one component.

14. The media of claim 13, wherein the power source comprises at least one of a battery and a capacitor.

15. The media of claim 13, wherein operations to save operating data to the FRAM comprise comparing the operating data to a prior version of the operating data previously stored in the FRAM and, if it is determined that the operating data is different from the prior version, overriding the prior version previously stored in the FRAM with operating data.

16. The media of claim 13, wherein the operating data comprises vehicle speed, engine speed, engine throttle power, acceleration, or a state of an acceleration pedal of the vehicle.

17. The media of claim 13, wherein prior to receiving the indication of the power loss event, the ECM is structured to perform operations to periodically save the operating data to the FRAM.

18. The media of claim 13, wherein the FRAM is a dual-buffer FRAM.

* * * * *